INVENTORS:
JOSEPH LEWIS CARD
WILLIAM ERBY PASSONS
FREDDIE M. RICHMOND
BY Harrington A. Lackey
ATTORNEY Dec. 30, 1969  J. L. CARD ET AL  3,486,780
FRINGE KNOT TYING MACHINE Filed June 6, 1968  6 Sheets-Sheet 3

INVENTORS:
JOSEPH LEWIS CARD
WILLIAM ERBY PASSONS
FREDDIE M. RICHMOND
BY Harrington A. Lackey
ATTORNEY

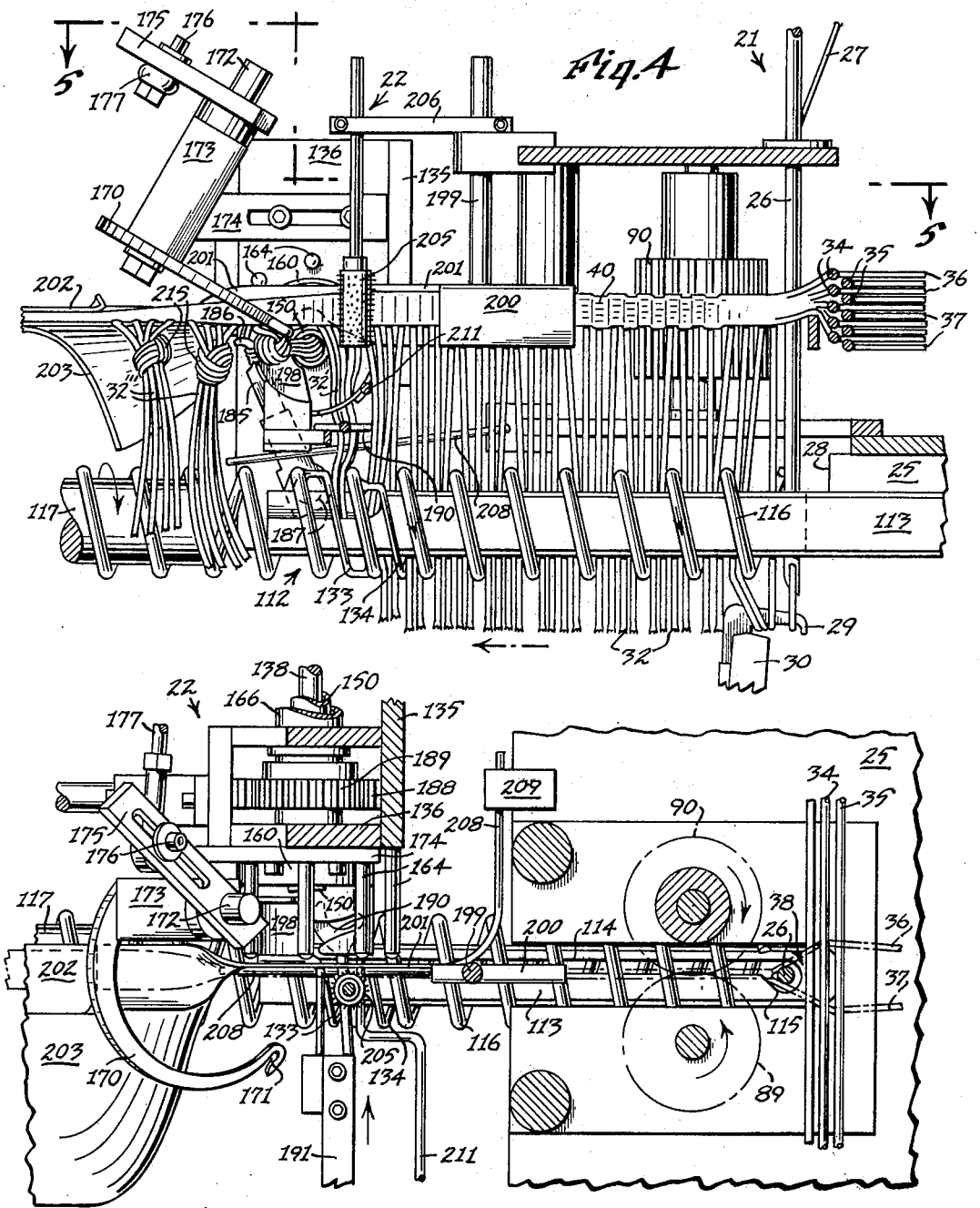

Dec. 30, 1969    J. L. CARD ETAL    3,486,780
FRINGE KNOT TYING MACHINE
Filed June 6, 1968                  6 Sheets-Sheet 5
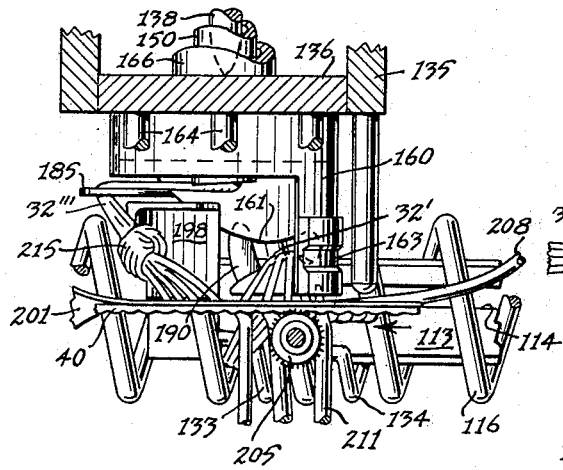
Fig. 6
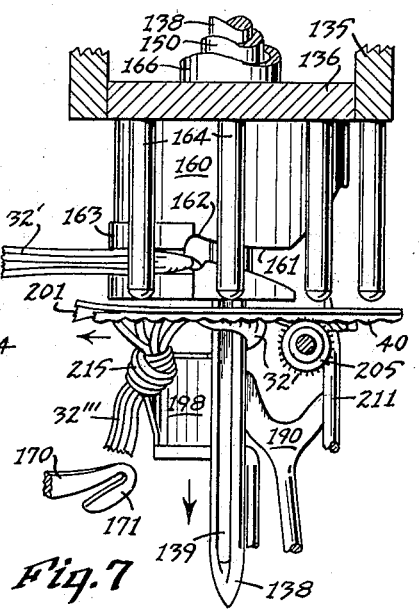
Fig. 7
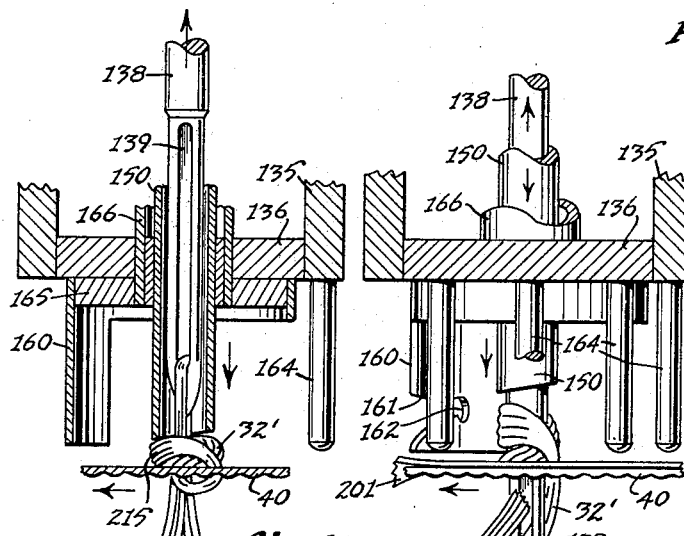
Fig. 10   Fig. 9   Fig. 8
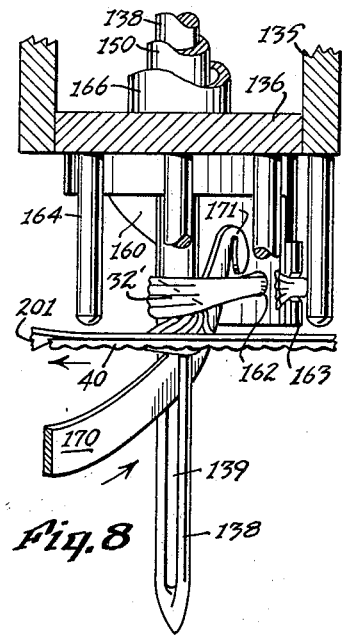
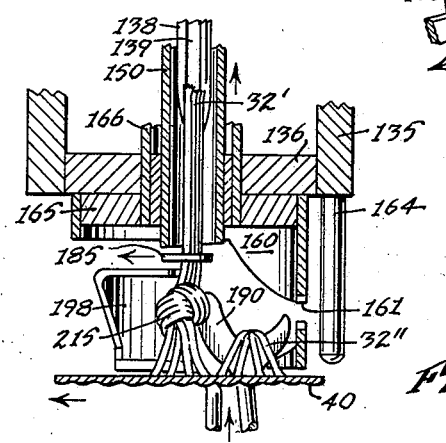
Fig. 11
INVENTORS:
JOSEPH LEWIS CARD
WILLIAM ERBY PASSONS
FREDDIE M. RICHMOND
BY Harrington A. Lackey
ATTORNEY

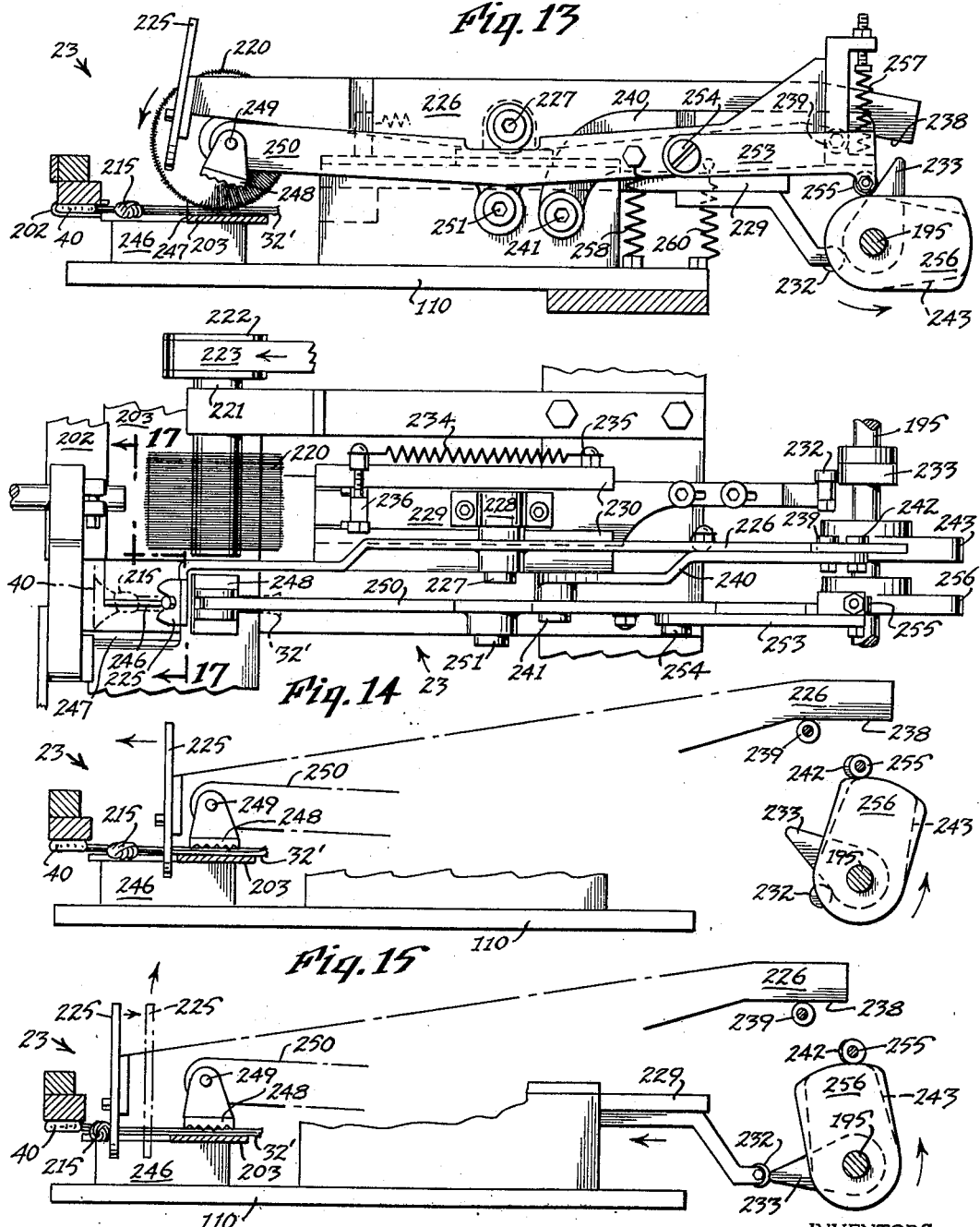

United States Patent Office 3,486,780
Patented Dec. 30, 1969

3,486,780
FRINGE KNOT TYING MACHINE
Joseph Lewis Card and William Erby Passons, Chattanooga, Tenn., and Freddie M. Richmond, Dalton, Ga., assignors to Fringe Equipment, Inc., Chattanooga, Tenn., a corporation of Tennessee
Filed June 6, 1968, Ser. No. 734,954
Int. Cl. B65h 69/04
U.S. Cl. 289—2                  21 Claims

ABSTRACT OF THE DISCLOSURE

A machine particularly adapted for tying a half-hitch knot in fringed strands depending from a web of fabric, including a transversely reciprocable tying needle having an elongated eye, a rotary looper element for engaging the free end of the strand and wrapping it around the tying needle in protracted position, a reciprocable hook member adapted to extend through the eye in the protracted needle, engage the free end portion of the strand and pull it through the needle eye, and means for retracting the tying needle to pull the free end of the strand through the wrapped portion of the strand to complete the knot.

BACKGROUND OF THE INVENTION

This invention relates to a machine for tying a knot in a strand, and more particularly to a machine for tying knots in successive strands of a fringe depending from a moving web.

There are various machines for making narrow strips of fringe material which are used in the decoration and trimming of larger sheets of fabric, such as bedspreads and rugs. Most of these machines make the fringe material in which the fringe strands depend freely from the webs without being knotted. However, there is a demand for fringe material in which the strands are tied in knots. One example of a prior fringe knot tying machine is disclosed in U.S. Patent No. 504,315 issued to Arnold, Sept. 5, 1893. However, this machine is limited to a plurality of cam actuated pins twisting the yarns in the plane of the fringe while cooperating with a cam actuating hook reciprocating in a plane perpendicular to the fringe plane to tie a knot simultaneous with the formation of the fringe.

SUMMARY OF THE INVENTION

It is therefore an object of this invention to provide a knot tying machine, and particularly a machine for tying successive knots in strands of fringe material. This machine is particularly adaptable for use in conjunction with a fringe tufting machine, so that knots are tied in the fringe yarns immediately after the fringe is formed, in one continuous operation.

This knot tying machine incorporates a tying needle having an elongated eye adapted to reciprocate across the feed path of a moving strip of fringe material including a web from which the fringe yarns depend. A rotary looper element engages the free end portions of a strand or group of fringe yarns, and wraps the strand around the needle. A reciprocable hook member then projects through the eye of the protracted needle, engages the strand and pulls the free end portion through the eye. The needle then retracts to pull the free end portion of the strand through the wrapped portion of the strand to complete a half-hitch knot.

This invention also contemplates a knot tightening mechanism in which the free end of the knotted strand is held by a reciprocable shoe member while a forked tightener member straddles the yarn strand and moves away from the free end against the knot.

The operation of the various elements of the knot tying mechanism and the knot tightening mechanism are synchronized with the operation of a fringe tufting machine so that a strand consisting of a multiple number of fringe yarns may be tied into a single knot.

It is also an object of this invention to provide a fringe yarn feeding mechanism which separates the fringe yarns as they are formed into uniform strands of multiple yarns and which feeds these strands to the knot tying mechanism.

BRIEF DESCRIPTION OF THE DRAWINGS

FIG. 4 is an enlarged fragmentary front elevation of the knot tying mechanism and a portion of the fringe tufting machine;

FIG. 5 is a section taken along the line 5—5 of FIG. 4;

FIG. 6 is a fragmentary top plan view of the knot tying mechanism with parts broken away, and with the elements in substantially the same position as disclosed in FIGS. 4 and 5;

FIGS. 7, 8, 9, 10 and 11 are views similar to FIG. 6, with parts broken away, to show the operational sequence of the knot tying mechanism;

FIG. 13 is an enlarged sectional elevation taken substantially along the line 13—13 of FIG. 2, and disclosing the knot tightening mechanism;

FIG. 14 is a fragmentary top plan view of the knot tightening mechanism disclosed in FIG. 13;

FIG. 15 is a fragmentary schematic view similar to FIG. 13, but disclosing the elements in a subsequent operational position;

FIG. 16 is a fragmentary schematic view similar to FIG. 15, disclosing the elements in a further sequential operational position.

DESCRIPTION OF THE PREFERRED EMBODIMENT

Figure 1:
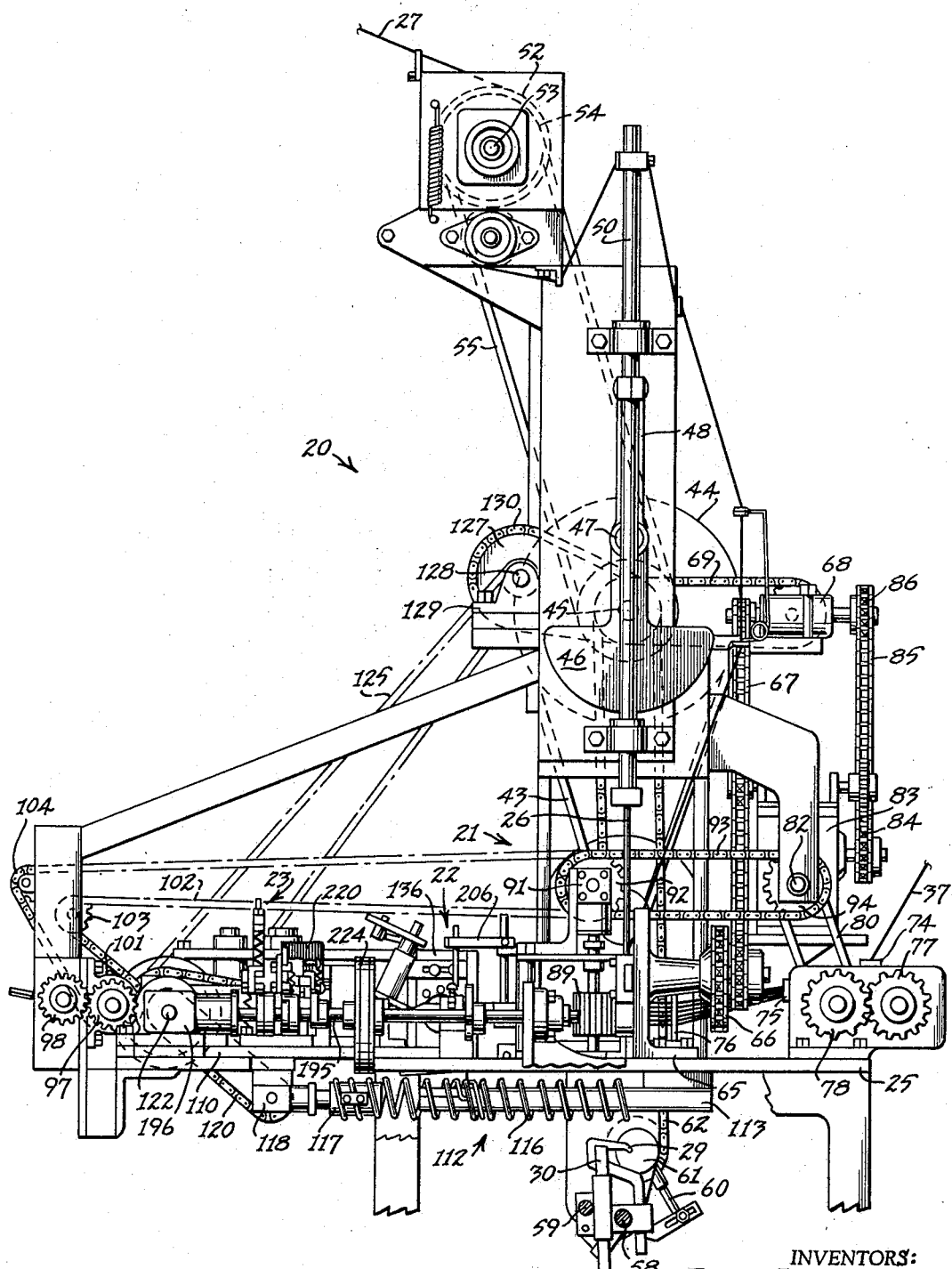
FIG. 1 is a front elevation of the knot tying machine made in accordance with this invention, associated with a fringe tufting machine.

Referring now to the drawings in more detail, a fringe making machine 20 is disclosed including a fringe tufting mechanism 21, a fringe knot tying mechanism 22 and a fringe knot tightening mechanism 23.

The fringe tufting mechanism 21 is practically identical to the fringe tufting machine disclosed in the pending application of J. L. Card and W. E. Passons, S.N. 551,349, now U.S. Patent 3,392,755, granted July 16, 1968. This fringe tufting mechanism 21 is mounted on table 25 and includes a vertically reciprocable tufting needle 26 adapted to carry a fringe yarn 27 through an opening 28 (FIG. 4) in the table 25. The tufting needle 26 cooperates with a tufting looper or hook 29 below the table 25 to form loops in the fringe yarn 27, and if desired, a reciprocable knife 30 cooperates with the hook 29 in order to cut the fringe loops and form cut fringe strands 32 as disclosed in FIG. 4.

The tufting needle 26 is also adapted to reciprocate in cooperation with a pair of banks of transversely extending and alternately reciprocable web yarn fingers 34 and 35. Each bank of fingers 34 and 35 has vertically spaced and aligned eyes for guiding the passage of web yarns 36 and 37, respectively, in order to form alternately opening sheds 38 through which the tufting needle 26 may reciprocably carry the fringe yarn 27, thereby forming a web or belt 40 from which depends the fringe strands 32.

In order to carry out the cooperating functions of the tufting needle 26, loop hook 29, knife 30 and web fingers 34 and 35, an electric motor 42 is mounted on the table 25 and drives, through a motor pulley, not shown, belt 43 and pulley 44, a needle drive shaft 45. The opposite end of the needle shaft 45 is fixed to a counter-weighted eccentric member 46 pivotally connected by pin 47 to the lower end of the crank arm 48. The upper end of crank arm 48 is pivotally connected to the needle bar 50, to the bottom end of which is fixed the tufting needle 26.

The fringe yarn 27 is supplied by any convenient means, such as a creel, not shown, to the upper yarn feed roll 52 (FIG. 1) rotatably mounted on the upper portion of the tufting mechanism 21, and positively driven by the yarn feed drive shaft 53 through pulley 54, belt 55 and drive pulley 56 fixed to the needle drive shaft 45. Thus, the fringe yarn 27 is fed in synchronism with the reciprocable movement of the tufting needle 26.

As best disclosed in FIG. 1, the tufting hook 29 is fixed to hook shaft 58, while the knife 30 is fixed to the knife shaft 59. The hook shaft 58 and knife shaft 59 are linked in a well-known manner and reciprocably rotated through link 60 and eccentric 61, which in turn is rotated by means of chain 62 and drive sprocket 63 fixed to the needle drive shaft 45 (FIGS. 1 and 2).

Figure 2:
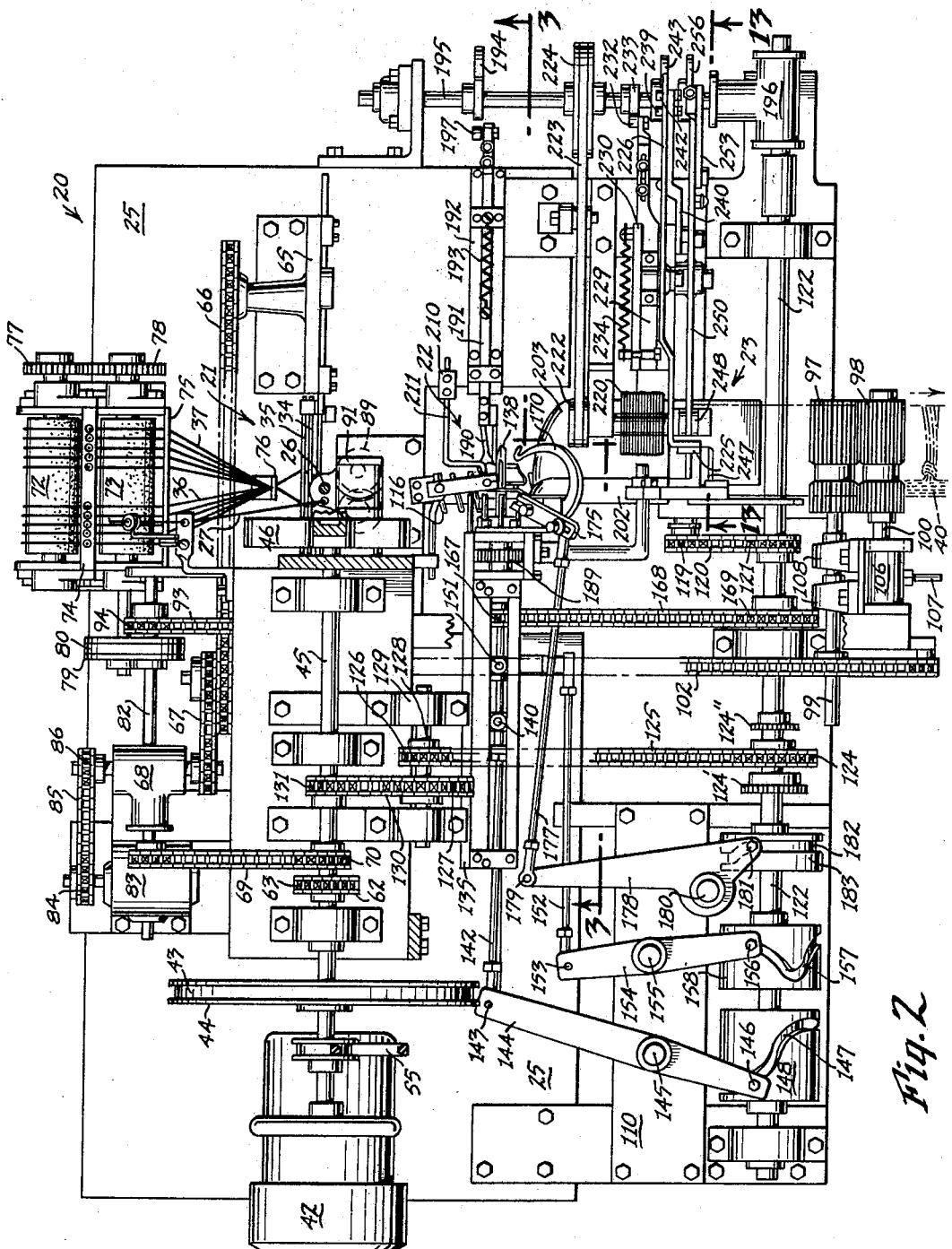
FIG. 2 is a top plan view of the machine disclosed in FIG. 1 with certain upper portions of the fringe tufting machine broken away.

The web yarn fingers 34 and 35 are reciprocably moved in opposite directions by rotary eccentric mechanisms, such as 65 disclosed in FIG. 2, causing the needle banks 34 and 35 to operate with simple harmonic motion. The eccentric mechanism 65 operates the bank of needles 35, while the eccentric mechanism for operating the needles 34 is hidden. The eccentric mechanism 65 and the other eccentric mechanism are driven simultaneously by the chain 66, which in turn is driven through a transmission train, including chain 67, right angle gear mechanism 68, chain 69 and drive sprocket 70 fixed to the needle shaft 45.

The web yarns 36 and 37 may be supplied to the fingers 34 and 35 by any convenient means, such as the web yarn feed rollers 72 and 73, through yarn guides, such as 74, 75 and 76 from a web yarn supply means, such as a separate creel, not shown. The web yarn roll 72 is driven by roll 73 through the sprockets 77 and 78. The roll 73 is in turn driven through pulley 79, belt 80, pulley 81, shaft 82, gear reducer 83, sprocket 84, chain 85 and sprocket 86 fixed to the right angle gear 68.

The web yarns 36 and 37 are pulled from the web fingers 34 and 35 past the tufting needle 26 by means of intermeshing web yarn pulling rolls 89 and 90. Actually, these pulling rolls 89 and 90 engage the fringe belt 40 after it has been woven or formed by the cooperation of the tufting needle 26 and the fingers 34 and 35. The pulling rolls 89 and 90 are driven through right angle gear member 91, sprocket 92, chain 93 and sprocket 94 fixed to the shaft 82.

The elements thus far described in the fringe tufting mechanism 21 are more fully disclosed in the co-pending application S.N. 551,349 of J. L. Card and W. E. Passons for "Fringe Tufting Machine," now U.S. Patent 3,392,755.

The fringe belt or web 40 is fed from the trailing pulling rolls 89 and 90 in a path, first through the knot tying mechanism 22, and then through the knot tightening mechanism 23, by means of a second or leading pair of cooperating web pulling rolls 97 and 98, having inter-digitating teeth. These rolls 97 and 98 rotate on shafts 99 and 100, respectively, having horizontal axes normal to the web feed path, for a purpose which will hereinafter appear. The shaft 99 is driven through a driven sprocket 101 and chain 102, traveling about idler sprockets 103 and 104 and passing around a drive sprocket, not shown, but fixed to the same shaft as the sprocket 92 which drives the trailing pulling rolls 89 and 90. In this manner, the two sets of yarn pulling rolls 97 and 98 and 89 and 90 are synchronously driven to feed the fringe belt 40 at the desired rate of speed and tension. Usually it is desirable to drive the leading pulling rolls 97 and 98 slightly faster than the trailing set of pulling rolls 89 and 90 in order to maintain tension in the fringe belt 40 at all times. By means of the eccentric bearing 106, having handle 107 and rotatably supporting the shaft 100, the spacing between the inter digitating teeth of the leading pulling rolls 97 and 98 may be adjusted toward or away from each other in order to control the slippage of the yarn belt 40, as the belt 40 is fed between the leading rolls 97 and 98 at a slightly faster speed than it is fed between the trailing rolls 89 and 90. In this manner, the tension in the belt 40 may be regulated at all times, manually and with a minimum of effort.

The shaft 99 is journaled in bearings 108 which are fixed to a portion of the machine frame 110 extending from the table 25.

Fixed to the bottom of the table 25 and extending between the tufting station, that is, the area where the fringe belt is formed by the tufting needle 26 and the web fingers 34 and 35, and the knot tying station or mechanism 22 is a fringe feeding mechanism 112. The fringe feeding mechanism 112 comprises a bar 113 fixed to and below the table 25 and vertically below and projecting in the same direction as the path of the belt 40. An elongated slot 114 extends vertically, entirely through the bar 113, and extends longitudinally of the bar 113 from an enlarged closed needle recess 115, through which the tufting needle 26 is adapted to reciprocate, to an open end in the direction of belt feed. The fringe feeding mechanism 112 also includes a helically coiled heavy wire 116 coaxially mounted around the bar 113. The coiled wire has a free end adjacent the tufting needle 26, but is fixed at its opposite end to a large spindle 117 rotatably mounted in a right angle gear box 118 fixed below the machine frame 110. The right angle gear box 118 is driven through sprocket 119, chain 120 and drive sprocket 121 fixed on the common drive shaft 122.

The common drive shaft 122 in turn is driven through driven sprocket 124 fixed to the common drive shaft 122, chain 125, reduction sprockets 126 and 127 fixed on counter-shaft 128 rotatably mounted on bracket 129 fixed to the tufting mechanism 21, as disclosed in FIGS. 1 and 2. The reduction sprocket 127 is in turn driven through chain 130 and drive sprocket 131 fixed to the needle shaft 45.

In this manner, it will be seen that the fringe feeding mechanism is driven in synchronism with the elements of the fringe tufting mechanism 21, including the tufting needle 26. As disclosed in the drawings, the drive sprocket 131 and reduction sprocket 126 are of equal size, while the reduction sprocket 127 and the driven sprocket 124 are of equal size, but each is twice the diameter of either sprocket 131 or 126. Accordingly, there is a four-to-one speed reduction between the needle shaft 45 and the common drive shaft 122. With the sprockets 121 and 119 of equal size, and with no change in ratio in the right angle gear mechanism 118, the helical feed coil 116 rotates at the same speed as the common drive shaft 122, and consequently will make one revolution for every four reciprocations or stiches formed by the tufting needle 26. Accordingly, as best disclosed in FIG. 4, the free end of the helical coil 116 will pick up and group four fringe loops at a time. Of course, when the fringe loops are cut, there are two yarn ends for each loop, and therefore eight yarn ends will be fed between each pair of adjacent coils 116 to constitute a strand 32. In the drawings, and particularly in FIG. 4, only four yarn ends in each strand 32 have been shown in order to simplify the drawings, based upon the assumption that one yarn end in each loop is hidden behind the other yarn end in each loop is hidden behind the other yarn end in the same loop, and therefore cannot be seen in the drawings. The grouping of the number of yarn ends in each strand, of course, can be varied by changing the ratio of the reduction gears 127 and 126 on the counter-shaft 128, or by shifting the chain 126 to engage either of the other sprockets 124' or 124" of different diameter than sprocket 124 (FIG. 2).

The spindle 117 is rotated in the direction of the arrow disclosed in FIG. 4 so that the helical coil 116 will rotate in the direction of the arrows, as disclosed, or in other words, counter-clockwise when looking in the direction of belt feed, or from the righthand side of FIG. 4.

Figure 3:
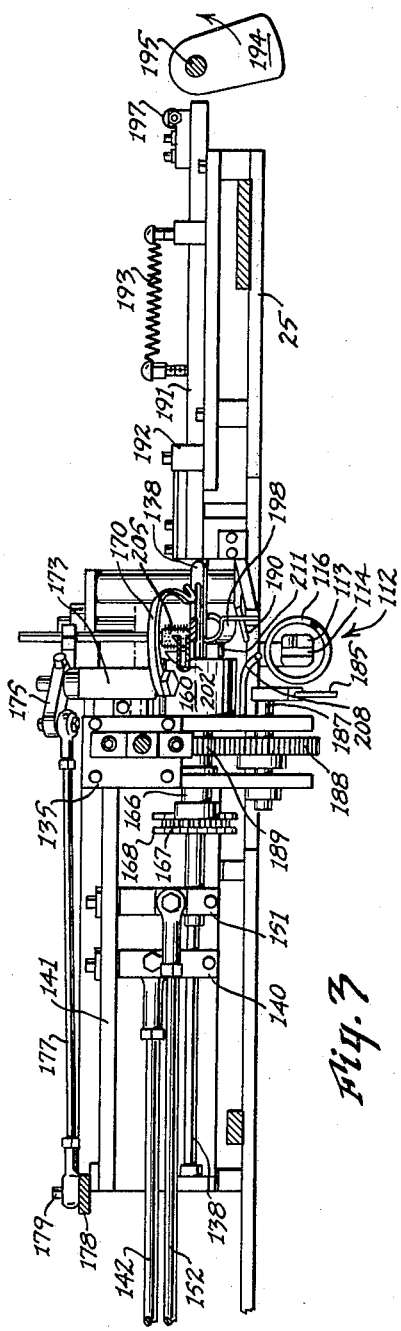
FIG. 3 is a fragmentary sectional elevation taken substantially along the line 3—3 of FIG. 2.

The fringe strands 32 are not only fed in groups of a multiple number of yarn ends, such as eight, by the rotating coils 116, but the strands 32 also extend downwardly between the coils 116 and through the slot 114 so that the strands are maintained under constant control as belt 40 is fed from the tufting station 21 to the tying mechanism 22. A pair of intermediate coil wires 133 and 134 may also be employed to bunch each strand into a tighter group of yarn ends to facilitate handling by the elements of the knot tying mechanism 22, The knot tying mechanism 22 includes a frame 135 having a face plate 136 spaced behind and parallel to the feed path of the fringe belt 40. Mounted to move reciprocably between a protracted position beyond the face plate 136 (FIG. 7) and a retracted position behind the face plate 136 (FIG. 6) is a tying needle 138. Extending through and adjacent the free end of the needle 138 is an elongated slot or eye 139. The opposite end of the tying needle 138 behind the face plate 136 is fixed to a slide block 140 adapted to reciprocably slide in the guide frame 141 (FIG. 3). The guide block 140 is connected to one end of link rod 142, the opposite end of which is pivotally connected by pin 143 to one end of a lever 144. The middle portion of the lever 144 is pivotally connected to the machine frame 110 by pin 145, and the opposite end of lever 144 is provided with a cam follower 146, adapted to travel in the cam track 147 of cam 148 fixed to the common drive shaft 122 (FIG. 2).

Also mounted to move reciprocably through the face plate 136 and telescopingly receiving the tying needle 138 is a tubular sleeve 150. The rear end of the sleeve 150 is also fixed to a slide block 151 slidably received to reciprocate within the guide frame 141, The slide block 151 is connected by link rod 152 to one end of lever 154 by pivot pin 153. The middle portion of lever 154 is pivotally connected to the machine frame 110 by means of the pivot pin 155, and the opposite end of the lever 154 is provided with cam follower 156 riding in cam track 157 on cam 158 fixed to the common drive shaft 122. It will be noted by the configuration of cam tracks 147 and 157 and also by the relative positions of the tying needle 138 and sleeve 150 in FIGS. 6–11, that the needle 138 and sleeve 150 reciprocate in opposite directions during the major portion of the knot tying cycle. Thus, when the needle 138 is in retracted position, as disclosed in FIGS. 6 and 11, the sleeve 150 is in its protracted position, and when the needle 138 is protracted, as in FIG. 8, the sleeve 150 is retracted.

Mounted for rotatable movement in front of face plate 136 is a looper element 160. The looper element 160 is in the shape of a cylindrical segment coaxial with the tying needle 138, and mounted to rotate clockwise as viewed in FIGS. 4 and 12. The cylindrical wall of the rotary looper element 160 is provided with a strand-engaging slot 161 having a slightly enlarged closed end 162 and opening in the direction of rotation, On the outer cylindrical surface of the rotary element adjacent the closed slot end 162 is a circumferentially extending grooved fringe guide 163. Fixed to the face plate 136 and projecting forward are a plurality of strand tension rods or fingers 164 spaced in an arc having a radius slightly greater than the radius of the cylindrical looper element 160. The rotary looper element 160 is fixed to a disc hub 165, which in turn is fixed to a tubular shaft 166 extending rearwardly through the face plate 136. The rear end of the looper shaft 166 is fixed to a sprocket 167, which in turn is driven through the chain 168 from drive sprocket 169 fixed to the common drive shaft 122 (FIGS. 2 and 3). The sprocket 167 is one-half the diameter of the drive sprocket 169, so that for each revolution of the common drive shaft 122, the tying needle 138 and sleeve 150 will reciprocate once, while the rotary looper element 160 will make two complete revolutions.

A longitudinally curved hook member 170 has a free hooked end 171 adapted to reciprocate through the needle eye 139. The other end of the hook member 170 is fixed to the bottom of a rotary shaft 172 rotatably mounted within a bearing block 173 fixed to the face plate 136 by means of bracket 174. The top portion of the shaft 172 is fixed to a slotted lever arm 175. Adjustably mounted in the slotted portion of the lever arm 175 by means of bolt or pin 176 is link rod 177, the opposite end of which is connected to one end of lever 178 by pivot pin 179. The middle portion of cam lever 178 is pivotally mounted upon machine frame 110 by pivot pin 180, and the opposite end of the lever 178 carries a cam follower 181 riding in cam track 182 on cam 183 fixed to the common drive shaft 122.

The cam track 182 is so designed that rotation of the common shaft 122 will cause the hook member 170 to move through the needle eye 139, as disclosed in FIGS. 7 and 8, in timed relation with the rotary looper element 160 so that the hooked end 171 will engage the fringe strand 32 held by the looper slot 161 and pull the strand back through the needle eye 139, as disclosed in FIG. 9.

As best disclosed in FIGS. 3, 4 and 11, a yarn stripping-finger 185 having a hooked end 186 is fixed at its other end to a rotary shaft 187 journaled through the face plate 136 below and parallel to the tying needle 138. Fixed to the stripper shaft 187 is a gear 188 which meshes with a gear 189 fixed to the looper shaft 166. It will be noted in FIGS. 3 and 5, that the upper gear 189 on the looper shaft 166 is one-half the diameter of the lower gear 188 fixed to the stripper shaft 187. In this manner, the yarn or strand-stripping finger 185 makes only one revolution for every two revolutions of the looper element 160.

A yoke or forked yarn-positioning element 190 is fixed to an elongated reciprocable bar 191 supported and guided for longitudinal reciprocable movement in a guide 192 mounted on the table 25 (FIG. 3). The yoke 190 is adapted to reciprocate toward and away from face plate 136, and in its projected position to move below the rotary looper 160 substantially in vertical alignment with the strand slot 161, as best disclosed in FIG. 6. The yoke bar 191 is normally biased toward its forward retracted position by the spring 193 (FIGS. 2 and 3), one end of the spring 193 being fixed to the guide 192, while the other end of the spring 193 is fixed to the yoke bar 191. The yoke bar 191 is urged to protracted position by the rotary cam 194 fixed to the cam shaft 195, which in turn is drivingly connected through right angle gear mechanism 196 to the common drive shaft 122. The rotary cam 194 engages the cam follower 197 on the yoke bar 191 to thrust the yoke 190 to its protracted position, disclosed in FIG. 6, once during each revolution of the cam shaft 195, which revolves at the same speed as the common drive shaft 122.

Also fixed to the yoke bar 191 adjacent the yoke 190 is a cup-shaped, fringe knot, retracting member 198. This knot retracting member 198 is reciprocably moved longitudinally with the yoke 190 so that both the yoke 190 and the knot retracting member 198 are simultaneously protracted and retracted, for a purpose to be described later. The knot retracting member 198 is best disclosed in FIGS. 4, 5, 6, 7 and 11.

Fixed to the frame of the fringe tufting mechanism 21 is a depending post 199, the bottom end of which is fixed to the top of an inverted channel-shaped web guide 200, as best disclosed in FIG. 4. This inverted channel guide 200 is located in the path of the fringe web 40 between the tufting needle 26 and the tying needle 138. The back wall 201 of the channel guide 200 continues along and in the direction of the web feeding path to a point beyond the tying needle 138, and then is gradually twisted or turned to a horizontal position, as best disclosed in FIGS. 4 and 5. In this manner, the back guide wall 201 rotates the fringe web 40 through approximately 90° from its vertical position before the fringe strands 32 are tied in knots, to a horizontal position after the knots are tied. After assuming a horizontal position, the back wall 201 then forms the bottom wall of another horizontally disposed channel guide 202 opening forwardly, or away from the face plate 136.

A curved apron 203 may also be employed to form an extension of the bottom wall of the horizontal web channel guide 202 in order to gradually guide the knotted fringe strands 32 from a vertical to a substantially horizontal position for presentation to the knot tightening mechanism 23. The apron 203 is best disclosed in FIGS. 4 and 5.

A freely rotatable web guide roller 205 is supported in a depending vertical position from a bracket 206, which may also be fixed to the depending post 199. The guide roller 205 is adapted to firmly hold the portion of the fringe web 40 against the back wall 201 in the vicinity of the tying needle 138 during the knot tying operation.

An elongated fringe guide rod 208 extends in the direction of web feed substantially in the same vertical plane as the back guide wall 201, but below the guide wall 201. The guide rod 208 is curved as shown in FIG. 5 and fixed to the table 25 by bracket 209. The fringe guide rod 208 guides the fringe strands 32 to hang freely from the rod 40 in substantially the same vertical plane until acted upon by the yoke 190 in the fringe tying operation.

Fixed to the table 25 by a bracket 210, as disclosed in FIG. 2, is an elongated fringe separating finger 211. The separating finger 211 has an angular bend, as best disclosed in FIGS. 2 and 5, so that it will be directed parallel to the tying needle axis to a position closely adjacent the bottom portion of the rotary looper 160, and above and to the right of the yoke 190, as viewed in FIG. 4. This finger 211 maintains the separation between the strand 32' engaged by the yoke 190 to be tied into a knot, and the strand 32 immediately behind the strand 32'. In this manner, adjacent strands, such as 32 and 32', will not accidentally be intermixed and tied together.

The operation of the knot tying mechanism 22 is as follows:

The fringe web 40 is pulled from the fringe tufting station where the fringe web 40 and strands 32 are formed by the tufting needle 26, looper 29, knife 30 and the oppositely reciprocating web fingers 34 and 35, by the leading puller rolls 97 and 98 and the trailing puller rolls 89 and 90. The fringe web 40 is maintained taut between the two sets of puller rolls 97–98 and 89–90 by virtue of the leading puller rolls 97 and 98 rotating at a slightly greater speed than the trailing rolls 89 and 90. Any excess tension in the web 40 is compensated by the web slipping between the grooved teeth of the leading rolls 97 and 98. Furthermore, the tension can be adjusted by the eccentric puller roll bearing 106.

The web 40 is fed from the tufting station to the knot tying station adjacent the tying needle 138 in a vertical position by virtue of the vertical disposition of the trailing rolls 89 and 90, the inverted web channel guide 200, the vertically disposed back guide plate 201 and the vertical guide roller 205. The fringe strands 32 are maintained in substantially the same vertical plane as the web 40 and uniformly separated by the fringe feeding mechanism 112, previously described. The guide rod 208 also assists in maintaining the lower portions of the strands 32 in a vertical position, particularly when acted upon by the elements of the knot tying mechanism 22.

In describing the operation of the knot tying mechanism 22, initial positions of all the elements of the mechanism 22 will be assumed just prior in time to their positions disclosed in FIG. 6, that is, just prior to engagement of the strand 32' by yoke 190. Initially, the tying needle 138 is retracted, while the tubular sleeve 150 is moving toward a retracted position. The looper slot 161 of the looper element 160 would be several degrees behind its position in FIG. 6 and generally in the top portion of its rotary orbit. The cam 194 would be in a position about 180° from its position disclosed in FIG. 3 preparatory to engaging the cam follower 197.

Then, as the common shaft 122 and cam shaft 195 continue to rotate, the yoke 190 begins to move across the web feed path to engage and carry rearwardly, the strand 32'. It will be understood that the knot retracting member 198 moves simultaneously with the yoke 190. When the elements of the knot tying mechanism 22 reach the positions disclosed in FIG. 6, the strand 32' has been positioned by the yoke 190 in the rotary path of the slot 161. The same position of the elements in FIG. 6 is also disclosed in FIGS. 4 and 5. As disclosed in FIG. 4, it will be seen that as strand 32' is being engaged by the looper element 160, the separator finger 211 prevents the next succeeding strand 32 from interfering with the strand 32'. Also in the position of FIG. 6, the tying needle 138 is beginning to move forward, while the tubular sleeve 150 is in its fully retracted position.

As the rotary looper element 160 rotates through approximately 180° from its position in FIG. 6 to its position in FIG. 7, tying needle 138 has protracted beyond the face plate 136 and substantially beyond the feed path of the web 40 so that the strand 32' is wrapped almost 360° around the tying needle 138, and the trailing yarn ends of strand 32' extend radially outwardly through the closed end 162 of the looper slot 161 and are depressed to lie in the circumferential groove of the fringe guide 163 by the first of the tension fingers 164. The guide 163 and the tension fingers 164 apply friction to the trailing ends of the strand 32' in order to help tighten the looped portion of the strand 32' about the tying needle 138.

The rotary looper element 160 moves a little less than a half-turn between its position in FIG. 7 and its position in FIG. 8. During this approximate half-cycle of the looper element 160, the arcuate hook member 170, a fragment of which is shown in FIG. 7, moves toward and through the needle eye 139 until the hooked end 171 is projected behind the portion of the strand 32' stretched between the tying needle 138 and the closed end 162 of the looper slot 161 as disclosed in FIG. 8.

Figure 12:
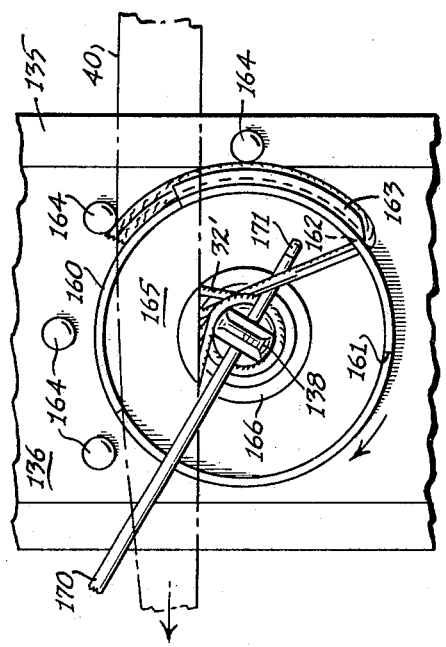
FIG. 12 is a fragmentary front elevation of a portion of the knot tying mechanism disclosing the elements in a sequential position slightly later in time than disclosed in FIG. 8.

FIG. 12 discloses an end view of the elements of FIG. 8, a fraction of a cycle later in which the looper element 162 has moved enough so that the stretched portion of the strand 32' has moved across and into the reciprocable path of the hooked end 171. In the position of FIG. 12, the strand 32' has been turned more than once about the tying needle 138 to form a complete loop.

It will be noted in FIGS. 8 and 12 that the rotary looper element 160 has already made one complete revolution while only one half the knot tying cycle has been completed.

In FIG. 9, the hook member 170 has been retracted so that its hooked end 171 carries the trailing ends of the strand 32' through the needle eye 139. The looper element 160 has rotated approximately 90° from its position in FIG. 8 or 12 to its position in FIG. 9, and the looper slot 161 no longer carries any portion of the strand 32'. Also in the position of FIG. 9, the needle 138 is retracting, while the tubular sleeve 150 is protracting.

In FIG. 10, the needle 138 has retracted, and the sleeve 150 has protracted to a relative position where the needle 138 has telescoped entirely within the confines of the tubular sleeve 150. The forward end of the sleeve 150 engages and holds the looped portion of the strand 32' while the retracting needle 138 pulls the trailing yarn ends entirely through the looped portion of the strand 32' to complete a half-hitch knot 215, as best disclosed in FIG. 11.

As the knot 215 is completed, the yoke 190 and knot retracting member 198 have protracted rearwardly to their positions disclosed in FIG. 11 to complete the cycle. As the yoke 190 projects the next succeeding strand 32" into the rotary path of the looper slot 161, the knot retracting member 198 is in a position to catch the knot 215 of the strand 32' as the web 40 continues to move in its feeding direction. Also in FIG. 11, the yarn stripping finger 185 has rotated to its upright position engaging the trailing ends of the group 32'. As the yarn stripping finger 185 continues to rotate, it pulls the trailing ends of the strand 32' out of the needle eye 139 and the tubular sleeve 150 as indicated in FIGS. 4, 5 and 6 with reference to the strand 32'''. Subsequently, the knot retracting member 198 is retracted to pull the knot 215 of strand 32' forward away from the yarn stripping finger 185, as indicated in FIG. 7 with reference to strand 32'''. The knotted fringe strand 32' is then free and is guided by the apron 203, as illustrated by strands 32'''' in FIG. 4, to a substantially horizontal position so that it will assume the proper attitude for operation thereon by the knot tightening mechanism 23.

As the web 40 is fed toward the knot tightening mechanism 23, the fringe strand 32' is engaged by a rotary brush 220 (FIGS. 2, 13 and 14), rotating about an axis parallel to the direction of feed and in the direction of the arrow disclosed in FIG. 13 to brush or wipe the strand 32' taut away from the web 40, and thereby straighten the individual strand yarns. The brush 220 is mounted on shaft 221, which is driven through pulley 222, belt 223 and pulley 224 mounted on the eccentric shaft 195.

A tightener member comprising a forked plate 225 is mounted on the rear end of a lever arm 226. The middle of the lever arm 226 is pivotally connected by a pin 227 to bracket 228 fixed to a slide bar 229. The slide bar 229 is adapted to reciprocate longitudinally and horizontally forward and rearwardly within the guideways 230 fixed to the machine frame 110. The front end of the slide bar 229 is provided with a cam follower 232 adapted to engage and respond to the movements of a cam 233 fixed to the cam shaft 195. The cam follower 232 is urged into constant engagement with cam 233 by means of a spring 234, one end of which is fixed to one of the guideways 230 at 235, while the other end is fixed by a bracket 236 to the slide bar 229.

The bottom edge of the front end of the lever arm 226 comprises a cam track 238 adapted to ride upon a cam follower or roller 239 fixed to an arm 240 pivotally connected by pin 241 to a fixed portion of the frame 110. Also fixed to the arm 240 below the cam follower 239 is another cam follower 242 adapted to engage cam 243 fixed to the cam shaft 195.

Figure 17:
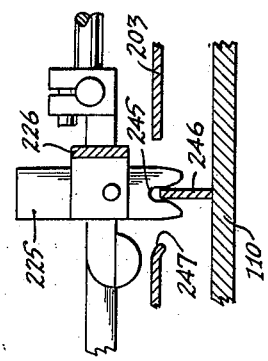
FIG. 17 is an enlarged section taken along the line 17—17 of FIG. 14.

The forked straightener member 225 forms a downwardly opening recess 245, as best disclosed in FIG. 17, large enough to straddle all of the yarn ends in the knotted strand 32' and to urge them against an upstanding rib 246 (FIGS. 14 and 17). The rib 246 not only supports, and retains the strand within the recess 245, but also acts as a guide for the longitudinal movement of the forked end of the straightener member 245.

Mounted slightly in front of the forked straightener member 225 and adapted to grip in operative position the trailing ends of the strand 32' is a shoe 248. The shoe 248 is pivotally connected by pin 249 to lever arm 250, the middle portion of which is pivotally connected by pin 251 to a portion of the machine frame 110. Pivotally connected to the front end of the lever arm 250 is a cam follower arm 253, connected by pin 254 and supporting the cam follower or roller 255. The cam follower 255 engages the cam 256 fixed to the cam shaft 195. The front end of the lever arm 250 is connected to the rear end of the pivotally connected cam follower arm 253 by means of a coil spring 257.

The front end of the lever arm 250 is urged downwardly by spring 258, which maintains the cam follower 255 in constant engagement with the surface of the cam 256. In a similar manner, the spring 260 connects the front end of the lever arm 226 to the machine frame 110 and urges the front end of the lever arm 226 downwardly to maintain the cam follower 242 in constant engagement with the cam 243.

An opening 247 is provided in the apron 203 immediately below the path of the forked straightener member 225 to permit the recess 245 to straddle the fringe strand 32' and force it against the rib member 246.

The operation of the knot tightening mechanism 23 is as follows:

Assuming that the initial position of the elements of the knot tightening mechanism 23 are as shown in FIG. 13, the web 40 is fed toward the leading puller rollers 97 and 98 beneath the forked member 225 and shoe 248 in raised inoperative position, and beneath the rotating brush 220. As the brushed strand 32' moves along the apron 203 and across the opening 247 the cam 256 has rotated from its position disclosed in FIG. 13 to a position slightly in advance of the position disclosed in FIG. 15, whereby the cam follower 255 rides up the leading edge of the cam 256, and as it rides over the leading corner, as disclosed in FIG. 15, the shoe 248 is forced down against strand 32' and is held in firm engagement therewith by virtue of the tension in the spring 257 (FIG. 13). As will be noted by the dashed-line shape of the cam 243, the path of the cam follower 242 is approximately the same but slightly behind, the path of cam follower 255. Consequently, the movement of the cam follower 242 transmitted through the pivotal arm 240 to the cam follower 239 and cam track 238 causes the forked straightener member 245 to descend to its operative position straddling the fringe strand 32' slightly after the shoe 248 grips the same stand (FIG. 15).

Subsequently, the cam 233 begins forcing the cam 232 rearwardly causing the slide bar 229 to move in its guideways 230, thus carrying the lever arm 226 and the forked straightener member 225 rearwardly, as disclosed in FIG. 16. The rearward movement of the straightener member 225 against the knot 215 while the strand 32' is firmly held by the shoe 248, and also while the web 40 is gradually moving in its feeding direction, will cause the knot 215 to tighten. As the cam follower 232 crosses the peak of the cam 233, as disclosed in FIG. 16, the cam follower 232 will ride forwardly across the trailing sloping surface of the cam 232 permitting the slide bar 229, and ultimately the forked straightener member 225, to retract to the dashed-line position of FIG. 16. Then, as the cam follower 242 drops off the trailing corner of its cam 243 the spring 260 pulls the front end of the lever arm 226 downwardly causing the forked straightener member 225 to rise in the direction of the arrow disclosed in FIG. 16 to its original inoperative position disclosed in FIG. 13. Just a fraction of a second after the straightener member 225 begins to rise, the cam follower 255 drops off the trailing edge of its cam 256 causing the shoe member 248 also to rise to its original inoperative position disclosed in FIG. 13.

The timing of the rotation of the cam shaft 195 is the same as the common shaft 122, so that there is one complete cycle of the knot tightening mechanism 23 for each complete cycle of the knot tying mechanism 22.

What is claimed is:

1. A machine for tying a knot in a strand comprising:
   (a) a tying needle having a longitudinal axis, front and rear ends, and an elongated eye adapted to permit the passage of a strand therethrough, (b) means supporting said needle for reciprocable axial movement between a protracted position and a retracted position, (c) means supporting said strand to extend across said needle in protracted position and behind at least a portion of said eye, said strand having a free end, (d) a looper element adapted to engage said strand, (e) means for moving said looper element to wrap the free end portion of said strand at least a complete revolution around said needle and behind the remaining portion of said strand, (f) a hook member adapted to pass through said eye and to engage saids, nt rad dde.oationrcappfidhi and to engage said strand, (g) means for reciprocably moving said hook member through said eye in front of said strand to a rear position for engaging the free end portion of said strand and to pull the free end portion of said strand forward across the remaining portion of said strand and through said eye, and (h) means for moving said needle rearward to said retracted position, causing said eye to pull the free end of said strand through the wrapped portion of said strand to complete a half-hitch knot.

2. The invention according to claim 1 in which said looper element is mounted for rotary movement about the axis of said needle.

3. The invention according to claim 2 further comprising means synchronously connecting said needle moving means, said looper element moving means and said hook member moving means so that said looper element makes two complete revolutions for each reciprocable cycle of said needle and said hook member.

4. The invention according to claim 2 further comprising a yarn positioning element, and means for reciprocably moving said positioning element in an axial direction substantially parallel to said needle axis to move the free end portion of a strand rearwardly to a position for engagement by said rotary looper element.

5. The invention according to claim 2 in which said rotary looper element comprises a cylindrical segment, the cylindrical axis of which coincides with said needle axis and a strand receiving slot in said segment opening in the direction of rotation of said looper element.

6. The invention according to claim 2 further comprising a cup-shaped retractor element, means supporting said retractor element for axial movement below and parallel to said needle axis, and means for moving said retractor element rearwardly while said needle is in retracted position, to engage and receive the knotted portion of said strand, and for moving said retractor element forward to carry the knotted portion of said strand out of the rotary path of said looper element.

7. The invention according to claim 1 further comprising a strand-stripping element, and means for moving said stripping element to engage the free end portion of said strand in front of said needle in retracted position and to pull the free end of said strand from said needle eye.

8. The invention according to claim 7 in which said stripper element is mounted for rotatable movement about an axis parallel to said needle axis, and is synchronously connected to said needle moving means to make one complete revolution for each axial reciprocable cycle of said needle.

9. The invention according to claim 1 further comprising a cylindrical sleeve having an inner diameter slightly greater than the diameter of said needle, means mounting said sleeve coaxially of said needle to telescopingly receive said needle, and means for reciprocably moving said sleeve axially of said needle so that said sleeve is in a retracted position substantially behind said strand when said needle is in protracted position, and said sleeve is in a protracted position to engage and tighten the knotted portion of said strand as said needle moves to its retracted position within said sleeve.

10. The invention according to claim 1 in which said hook member comprises a substantially circular-shaped arm having a free hooked end, said means for moving said hook member comprising means for rotating said hook member through an arcuate path having a radius substantially equal to the radius of said circular arm.

11. The invention according to claim 1 in which said strand comprises a group of fringe yarns depending from a web of fabric, said means for supporting said strand comprising means for moving said web in a longitudinal feed path transversely of said needle axis and above said needle.

12. The invention according to claim 11 further comprising a fringe yarn feeding mechanism having an elongated fringe guide member including an elongated guide slot parallel to said web feed path and receiving said depending fringe yarns therethrough, a helical wire member longitudinally receiving said guide member, and means for rotating said helical member about its longitudinal axis to separate said yarns into uniform strands and to positively feed said strands across said tying needle.

13. The invention according to claim 12 in which said means for rotating said helical wire member is adapted to rotate said wire member one revolution for each reciprocable cycle of said tying needle.

14. The invention according to claim 12 further comprising a fringe tufting machine for making said web and fringe yarns including a vertically reciprocable tufting needle and looper mechanism cooperating with said tufting needle to form said fringe yarns, and transversely reciprocable banks of web needles in advance of said tufting needles to form open sheds through which said tufting needle reciprocates to form said web, said fringe guide member having a vertical opening therethrough for receiving said tufting needle and being in open communication with said guide slots, said looper mechanism being spaced below said fringe guide member, said helical wire member terminating adjacent said tufting needle for engaging said fringe yarns as they are formed.

15. The invention according to claim 14 in which said means for moving said web comprises a leading pulling means adapted to pull said web away from said tying needle and a trailing pulling means adapted to pull said web from said tufting needle and toward said tying needle, and means for adjusting the speed of said leading pulling means to maintain tension in said web between said leading and trailing pulling means.

16. The invention according to claim 11 further comprising a fringe tufting machine for forming said web and said fringe yarn, including a vertically reciprocable tufting needle, looper means cooperating with said tufting needle to form said fringe yarns, transversely reciprocable banks of web needles in advance of said tufting needle to form alternate sheds of web yarn through said said needle penetrates to form said web, means for reciprocating said tufting needle synchronously connected to the means for moving said tying needle so that said tufting needle will form a multiple number of fringe stitches for each reciprocable cycle of said tying needle.

17. The invention according to claim 11 further comprising a knot-tightening mechanism spaced from said tying needle to receive said web and fringe strands after the knots have been tied in said strands, comprising:

(a) a platform upon which the free end portions of said knotted strands are supported, (b) a shoe member, (c) means for moving said shoe member toward and away from said platform to alternately clamp each strand against said platform, (d) a forked tightener member adapted to straddle said strand between said shoe member and the corresponding knot in said strand, and (e) means for reciprocably moving said forked tightener member toward and away from a position straddling said strand, and for moving said tightener member in said straddling position along said strand and against said knot, while said shoe member is in clamping position.

18. The invention according to claim 17 in which said means for moving said tightener member is adapted to retract said tightener member from said tightened knot in straddling position, and then to move said tightener member away from said straddling position slightly in advance of the movement of said shoe away from its clamping position.

19. The invention according to claim 18 further comprising a shoe arm, said shoe member being connected to one end of said arm and a cam follower on the opposite end of said arm, means pivotally supporting said shoe arm for rocking movement of said shoe member toward and away from clamping position upon said fringe strands, a cam shaft, a first rotary cam mounted on said cam shaft for engaging said cam follower, and means for continuously driving said cam shaft, a tightener arm, said tightener member being mounted at one end of said arm and a second cam follower mounted on the opposite end of said tightener arm, means pivotally mounting said tightener arm for rocking movement of said tightener member toward and away from said straddling position, a second cam mounted on said cam shaft for engaging said second cam follower, said pivotal mounting means for said tightener arm comprising a slide block, and a guideway receiving said slide block for movement longitudinally of said tightener arm, a third cam follower connected to said slide block, a third cam fixed to said cam shaft and adapted to engage said third cam follower to effect longitudinal movement of said tightener member in said straddling position.

20. The invention according to claim 11 further comprising a guide plate extending between said tying needle and said knot tightening mechanism, the portion of said guide plate adjacent said tying needle being disposed substantially in a vertical plane forming the rear side of said web feed path, and a portion of said guide plate adjacent said knot tightening mechanism being disposed in a substantially horizontal plane coplanar with said platform, the intermediate portion of said guide plate being curved to cause said web to twist from a vertically disposed position to a horizontally disposed position as it moves toward said knot tightening mechanism.

21. The invention according to claim 20 further comprising a rotary brush disposed over the horizontal portion of said guide plate and means for driving said rotary brush to rotate in a direction to pull said fringe yarns away from said web.

References Cited
UNITED STATES PATENTS

| | | | |
|---|---|---|---|
| 504,316 | 9/1893 | Arnold | 28—1 |
| 586,413 | 7/1897 | Arnold | 28—1 |
| 1,481,754 | 1/1924 | Stalson | 289—17 |
| 1,852,417 | 4/1932 | Klaiber et al. | 112—64 X |
| 1,855,541 | 4/1932 | Bamkin | 289—18 X |

LOUIS K. RIMRODT, Primary Examiner

U.S. Cl. X.R.

289—18